H. Lettington,
Bit Stock.
Nº 14,876.   Patented May 13, 1856.
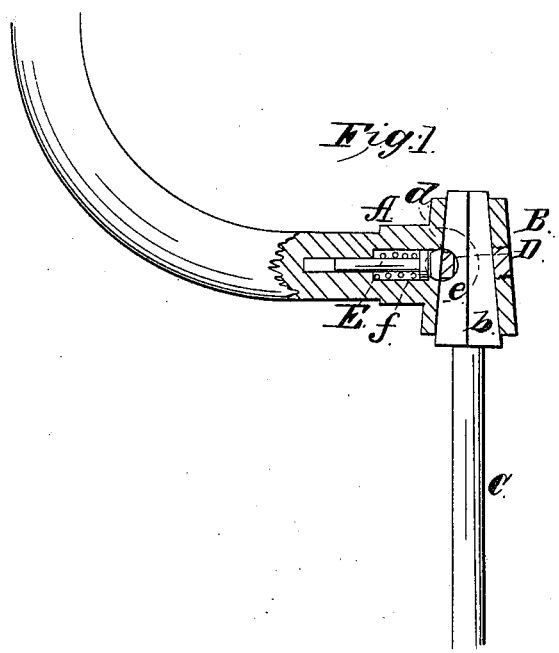
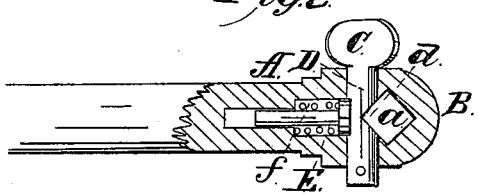

UNITED STATES PATENT OFFICE.

HORACE LETTINGTON, OF NORWICH, NEW YORK.

FASTENING BITS.

Specification of Letters Patent No. 14,876, dated May 13, 1856.

*To all whom it may concern:*

Be it known that I, HORACE LETTINGTON, of Norwich, in the county of Chenango and State of New York, have invented a new and Improved Mode of Securing Bits in Braces or Stocks; and I do hereby declare that the following is a full, clear, and exact description of the same, reference being had to the annexed drawings, making a part of this specification, in which—

Figures 1 and 2 are sections of the socket at the end of a bit stock, both planes of section being through the center and crossing each other at right angles.

Similar letters of reference indicate corresponding parts in both figures.

My invention consists in having a rod or arbor pass transversely through the end of the stock or brace adjoining the socket, a portion of the rod or arbor passing through the socket. This rod or arbor is notched and when it is turned so that the notch is in line with the aperture in the socket, the shank of the bit is inserted in said aperture, and by turning the rod, one half of a revolution the rod will fit in a notch in the shank of the bit and secure the bit in the socket. A small bolt having a spiral spring around it is fitted in the end of the stock or brace and the bolt bears against the rod or arbor and prevents it from casually turning.

To enable those skilled in the art to fully understand and construct my invention, I will proceed to describe it.

A, represents the end of a bit stock or brace and B, is the socket attached to its end. The socket has a square taper hole (*a*), made longitudinally through it to receive the shank (*b*) of the bit C, as shown in Fig. 1. The above parts are of usual construction and therefore a more minute description is not required.

Transversely through the stock or brace A, and adjoining the socket B, there passes a rod or arbor D of cylindrical form and having a flattened head (*c*) at one end. This rod or arbor is allowed to turn freely in the stock or brace, and a portion of it, about one half, passes through the hole (*a*) in the socket, and a notch or recess (*d*) is made in one side of it, so that when the rod or arbor is turned and the notch brought in line with the hole (*a*) in the socket, the shank (*b*) may be inserted in the hole (*a*) in the socket. The shank (*b*) has a notch (*e*) made in one side of it and the shank is so fitted in the socket that the notch (*e*) will be opposite the rod.

To secure the shank (*b*) in the socket B, the rod or arbor D, is turned till the unnotched side passes into the notch, (*e*) in the shank, see Fig. 1, the notch (*e*) being of semi-circular shape corresponding to the rod or arbor. To release the shank from the socket, the rod or arbor is turned till its notch (*d*) is brought in line with the hole (*a*) in the socket; the shank may then be withdrawn.

In the end of the stock or brace there is fitted a bolt E, having a spiral spring (*f*,) around it. This spring presses the end of the bolt against the side of the rod or arbor D and prevents it from turning casually, the rod or arbor opposite the notch (*d*) being flattened to allow a bearing for the end of the bolt E.

The above invention is simple, not liable to get out of repair and forms a cheap and effective fastening allowing the bit to be adjusted in the socket and withdrawn from it, with the greatest facility.

Having thus described my invention, what I claim as new and desire to secure by Letters Patent, is—

The rod or arbor D passing transversely through the stock or bit A, and a portion of the socket B, the rod or arbor having a notch (*d*) in one side and the shank (*b*) of the bit C, also having a notch (*e*) in one side and the rod having a bolt E pressing against it, the above parts being arranged as shown for the purpose specified.

HORACE LETTINGTON.

Witnesses:
ISAAC S. NEWTON,
WILLIAM N. MASON.